US011315346B2

(12) United States Patent
Driancourt et al.

(10) Patent No.: US 11,315,346 B2
(45) Date of Patent: Apr. 26, 2022

(54) METHOD FOR PRODUCING AUGMENTED REALITY IMAGE

(71) Applicant: SQUARE ENIX CO., LTD., Tokyo (JP)

(72) Inventors: Remi Driancourt, Tokyo (JP); Simon Stannus, Tokyo (JP)

(73) Assignee: SQUARE ENIX CO., LTD., Tokyo (JP)

( * ) Notice: Subject to any disclaimer, the term of this patent is extended or adjusted under 35 U.S.C. 154(b) by 0 days.

(21) Appl. No.: 16/745,274

(22) Filed: Jan. 16, 2020

(65) Prior Publication Data
US 2021/0224538 A1 Jul. 22, 2021

(51) Int. Cl.
| | |
|---|---|
| *G06V 20/20* | (2022.01) |
| *G06T 7/73* | (2017.01) |
| *G01S 19/47* | (2010.01) |
| *G06T 19/00* | (2011.01) |
| *H04W 4/02* | (2018.01) |
| *G06V 10/48* | (2022.01) |

(52) U.S. Cl.
CPC .............. *G06V 20/20* (2022.01); *G01S 19/47* (2013.01); *G06T 7/74* (2017.01); *G06T 19/006* (2013.01); *G06V 10/48* (2022.01); *H04W 4/026* (2013.01); *G06T 2207/30244* (2013.01)

(58) Field of Classification Search
CPC ..... G06K 9/00671; G06T 7/74; G06T 19/006; G06T 2207/30244; H04W 4/026; G06V 20/20

See application file for complete search history.

(56) References Cited

U.S. PATENT DOCUMENTS

| | | | | |
|---|---|---|---|---|
| 2012/0208551 | A1* | 8/2012 | Hill ......................... | H04W 4/02 455/456.1 |
| 2013/0077854 | A1* | 3/2013 | Kobayashi ............. | G01B 11/14 382/154 |
| 2014/0126769 | A1* | 5/2014 | Reitmayr .................. | G06T 7/73 382/103 |
| 2019/0026919 | A1* | 1/2019 | Aratani .................... | G06F 3/011 |
| 2019/0147619 | A1* | 5/2019 | Goldman .............. | B64C 39/024 382/154 |

OTHER PUBLICATIONS

Armagan, Anil et al., "Accurate Camera Registration in Urban Environments Using High-Level Feature Matching", British Machine Vision Conference (BMVC), Sep. 2017.

(Continued)

*Primary Examiner* — Ryan R Yang
(74) *Attorney, Agent, or Firm* — Dorsey & Whitney LLP (57) ABSTRACT

Examples described herein include methods for producing an augmented reality image. An example method includes a portable computer terminal obtaining a first estimated position and a first estimated orientation of a first scene; producing a first estimated image of the first scene; obtaining a first camera picture of the first scene; executing a first pattern matching between the first estimated image and the first camera picture; adjusting the approximate position and/or orientation of the portable computer terminal; executing a second pattern matching; and producing an augmented reality image considering the current position and orientation of the portable computer terminal.

10 Claims, 8 Drawing Sheets

(56) References Cited

OTHER PUBLICATIONS

Arth, Clemens et al., "Instant Outdoor Localization and Slam Initializtion From 2.5D Maps", IEEE Transactions on Visualization and Computer Graphics, vol. 21, No. 11, Nov. 2015.
Fond, Antoine et al., "Facade Proposals for Urban Augmented Reality", 16th IEEE International Symposium on Mixed and Augmented Reality, Oct. 2017.
Kroeger, Till et al., "Fast Optical Flow Using Dense Inverse Search", European Conference on Computer Vision, Oct. 2016, pp. 471-488.
Leach, Matthew et al., "Recreating Sheffield's Medieval Castle in Situ Using Outdoor Augmented Reality", International Conference on Virtual Reality and Augmented Reality, Oct. 2018, pp. 213-229.
Lee, Gun et al., "Cityviewar: A Mobile Outdoor AR Application for City Visualization", IEEE International Symposium on Mixed and Augmented Reality, Nov. 2012.
Leutenegger, Stefan et al., "Brisk: Binary Robust Invariant Scalable Keypoints", International Conference on Computer Vision, Nov. 2011.

\* cited by examiner

METHOD FOR PRODUCING AUGMENTED REALITY IMAGE

FIELD OF THE INVENTION

The present invention relates to a method for producing an augmented reality image, program, a storage device and an apparatus that implement the method.

BACKGROUND

Mobile Augmented Reality

In recent years mobile augmented reality has become widely available through the release of Android's ARCore and iOS' ARKit. This has made it possible to develop AR games and other experiences that are grounded in the real world using only hardware that most users already carry with them. However, the capability for current AR platforms to understand their environment is quite limited, leading to issues such as virtual objects failing to be occluded correctly and drifting out of alignment with the real world.

One way of avoiding this problem is to use a prior model of the environment. Having such a model also allows dynamic virtual objects to interact correctly with real-world surfaces and virtual characters to move around the environment intelligently.

Such model may be practical for location-specific experiences, including commercial promotions, theme parks and historic sites.

Having such a model of the real world also allows artists and designers to create experiences that exploit the specific geometry of the environment.

Augmented Buildings

Buildings generally share a number of properties that make them suitable environments for AR experiences: their geometry is both static and simple—often cubes with rectangular features aligned to a common vertical axis. In addition, because of their verticality and larger scale, many buildings can be viewed by a large number of users simultaneously with minimal occlusion by other people. This larger scale also means that GPS data becomes useful (in combination with compass heading and IMU data) for registering the device's pose within the environment. However, both GPS and compass data suffer from inaccuracies. GPS particularly suffers in urban environments due to blocked satellite signals and multipath errors. The visual misalignment that this error causes is considerable enough that previous work relying solely on those data has required users to view the experience from pre-defined viewpoints and then manually adjust the yaw alignment.

Camera Pose Registration

A number of previous works have used various computer vision techniques to derive a more accurate camera pose. Fond et al. (2017) developed a system using neural networks to produce various cues about candidate façade regions that could be matched against a façade database. However, they acknowledged that their method would not be suitable for accurate pose estimation due to the invariance of Convolutional Neural Network (CNN) descriptors to small translations.

SUMMARY

It is an object of the invention disclosed herein to provide a method for producing an augmented reality image which does not drift out of alignment with the real world.

One of the inventions disclosed herein relates to a method for producing an augmented reality image.

The method comprises following steps.

A portable computer terminal obtains a first estimated position and a first estimated orientation by estimating position and three-dimensional orientation of a portable computer terminal by means of a GPS unit, a compass and an inertial measurement unit in the portable computer terminal.

The portable computer terminal produces a first estimated image of a first scene using the first estimated position and the first estimated orientation.

The portable computer terminal obtains a first camera picture of the first scene by means of a camera in the portable computer terminal.

The portable computer terminal executes a first pattern matching between the first estimated image and the first camera picture to obtain approximate position and orientation of the portable computer terminal.

The portable computer terminal adjusts the approximate position and/or orientation of the portable computer terminal by an offset to a new possible position and orientation of the portable computer terminal.

The portable computer terminal executes a second pattern matching between a second camera picture and an image of a second scene to obtain information of a current position and orientation of the portable computer terminal, the second camera picture taken by means of the camera and the image of the second scene being produced considering the new possible position and orientation of the portable computer terminal.

Then the portable computer terminal produces an augmented reality image considering the current position and orientation of the portable computer terminal.

It is preferred that the first pattern matching is executed regarding a building in the first scene and the second pattern matching is executed regarding a building in the second scene.

Other invention disclosed herein relates to a program. The program has instructions for execution by a processor to perform the method disclosed herein.

Other invention disclosed herein relates to a non-transitory computer readable storage device. The device has instructions for execution by a processor to perform the method disclosed herein.

Other invention disclosed herein relates to a portable computer terminal for producing an augmented reality image. The terminal comprises a processor, a GPS unit, a compass, an inertial measurement unit, a camera, a display and a memory device having a program stored thereon for execution by the processor to the method disclosed herein. The GPS unit, the compass, the inertial measurement unit, the camera, the display and the memory are coupled to the processor.

It is possible to provide a real-time calculation of mobile device position and orientation in real-world space based on insufficiently accurate but reliable input data by GPS, Compass and VIO systems (IMU); Camera frames; and Partial 3D model of local environment. The system then allows accurate rendering of virtual content into live video.

DETAILED DESCRIPTION

In the following description, reference is made to the accompanying drawings that form a part hereof, and in which is shown by way of illustration specific embodiments, which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media or computer readable storage device such as one or more memory or other type of hardware-based storage devices, either local or networked. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

Figure 1:
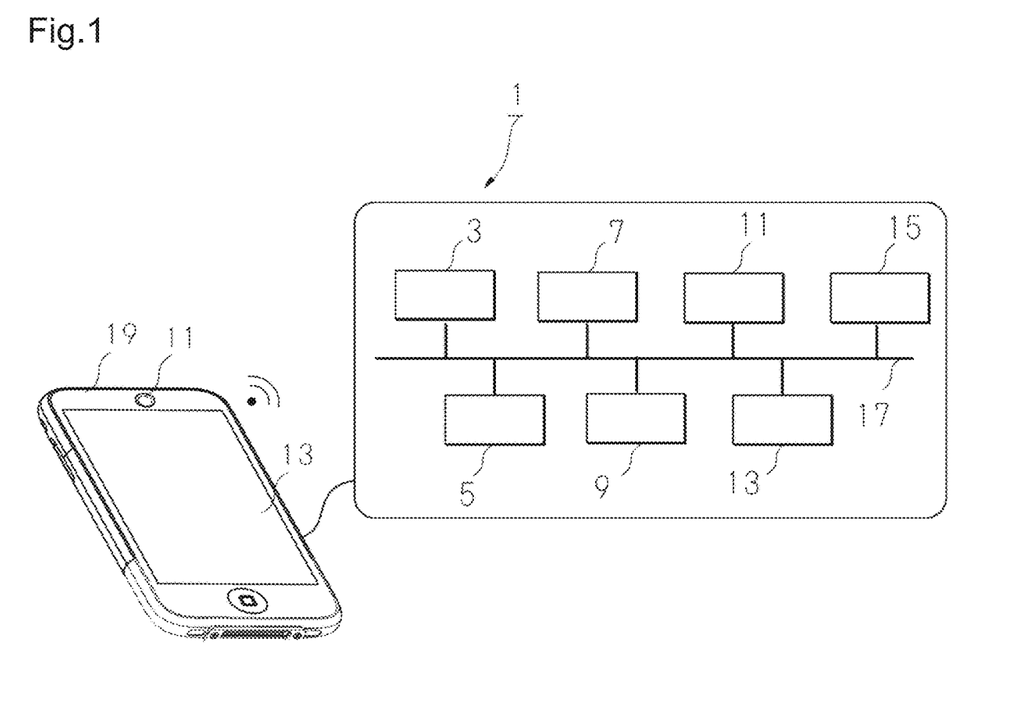
FIG. 1 shows a block diagram of an augmented reality (AR) system.

FIG. 1 shows a block diagram of an augmented reality (AR) system. FIG. 1 provides a way for a person to quickly identify which device belongs to them. Such an AR system is a portable computer terminal and may be a Smartphone, a mobile phone, a tablet or a head mounted wearable. The portable computer terminal comprises a computer system to implement an AR method.

As shown in FIG. 1, an example of the system 1 comprises a processor 3, a GPS unit 5, a compass 7, an inertial measurement unit (IMU) 9, a camera 11, a display 13 and a memory device 15. All the elements are connected to the processor, e.g., through bus 17 and can exchange information through the bus 17. The system 1 may be implemented in a portable computer terminal 19. The system may further contain elements or devices which a usual portable computer terminal may contains. The memory device 15 may contain various applications and various programs. Examples of such elements are a communication tool, a speaker, a microphone and GPU. The inertial measurement unit (IMU) 9 may be an electronic device that measures angular rate and the orientation of the terminal, using a combination of accelerometers, gyroscopes, and sometimes magnetometers. IMU are sometimes called as INU (inertial navigation unit), IGU (inertial guidance unit), and IRU (inertial reference unit). The compass 7 and the inertial measurement unit (IMU) 9 may be realized by a program that can provide orientation of the terminal.

Figure 2:
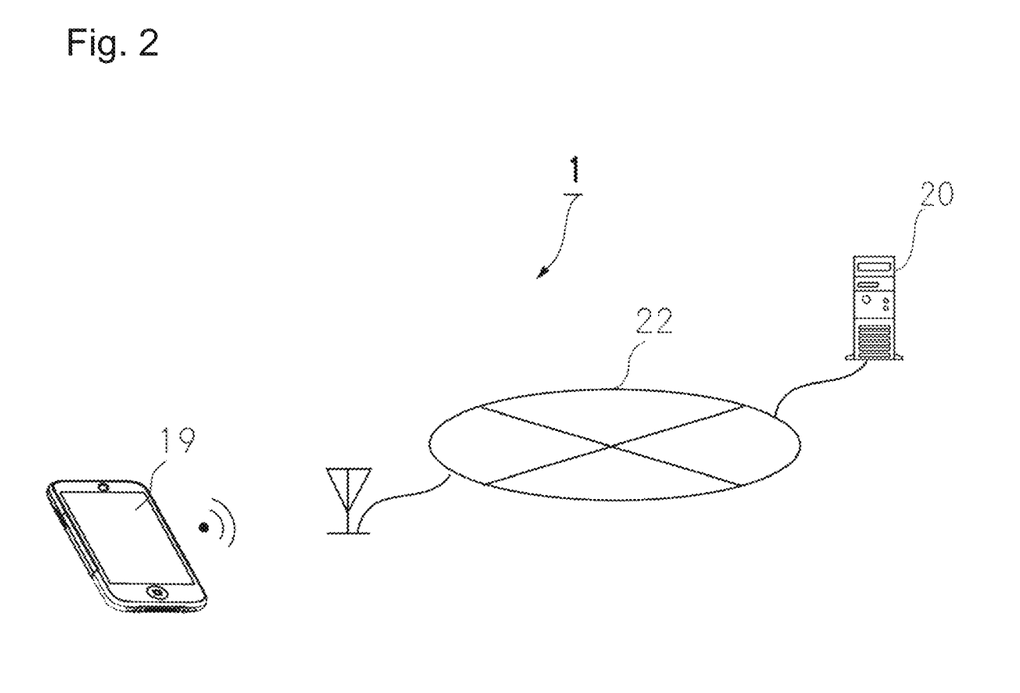
FIG. 2 shows a server system that relates to an augmented reality (AR) system.

FIG. 2 shows a server system that relates to an augmented reality (AR) system. As shown in FIG. 1, the system may be implemented in a portable computer terminal 19. Further, the system may be implemented in a server-client system as shown in FIG. 2. The system may be a cloud system. In FIG. 2, the portable computer terminal 19 is connected to the server 20 through the network 22. Part of the arithmetic processing explained herein may be executed on the server in a cloud. The cloud processing may include the generation of the estimated images and the pattern matching for both first and second stage explained bellow.

Figure 3:
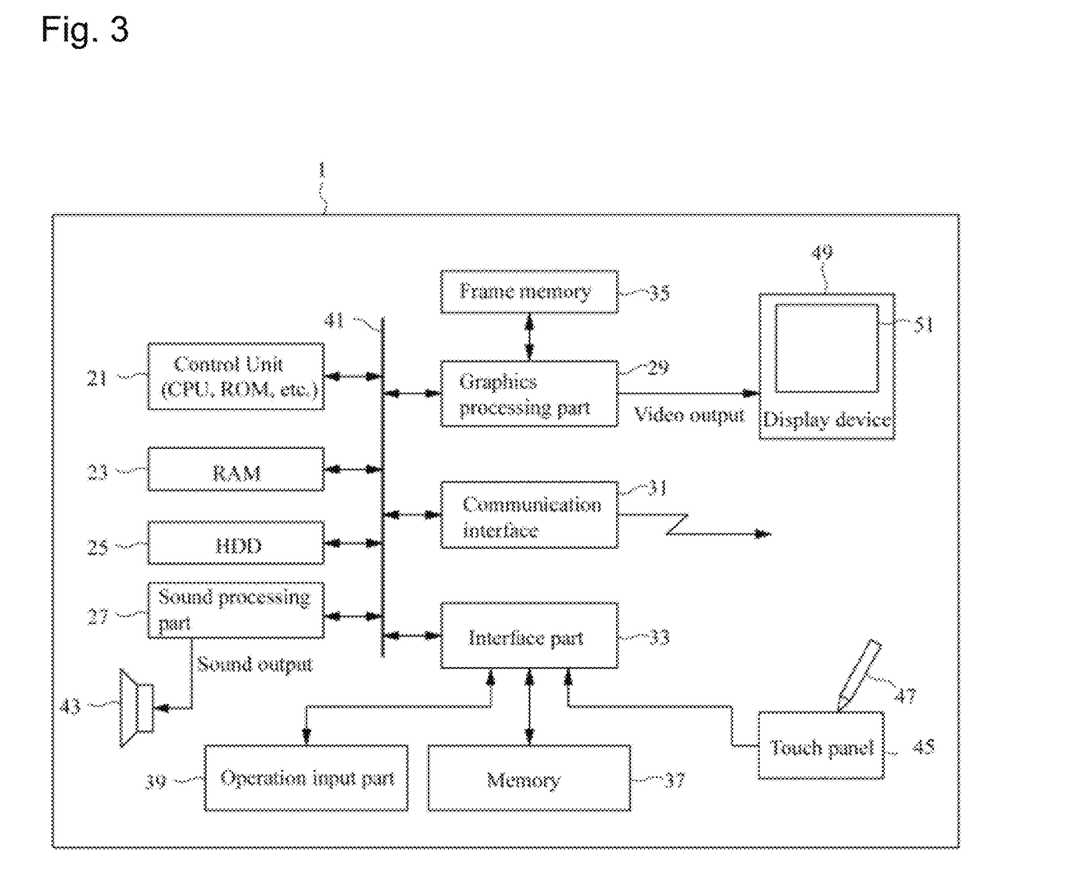
FIG. 3 is a block diagram for illustrating a configuration example of a computer.

FIG. 3 is a block diagram for illustrating a configuration example of a computer. The circuit placed within the system 1 may comprise a control unit 21, a RAM 23, a hard disc drive (HDD) 25, a sound processing part 27, a graphics processing part 29, a memory that stores a program or programs, communication interface 31, an interface part 33, a frame memory 35. The system may have a card slot when a program is stored in a card type memory. The control unit 21, the RAM 23, the hard disc drive (HDD) 25, the sound processing part 27, the graphics processing part 29, the communication interface 31, and the interface part 33 are each connected to an internal bus 41.

The control unit 21, comprising a CPU, a ROM, etc., controls the entire AR system in accordance with the control program stored in the HDD 25 or the memory 37. The control unit 21 is provided with an internal timer which is used, for example, to generate timer interrupts. The RAM 23 is also used as a working area for the control unit 21.

The sound processing part 27, provided with a sound input/output interface function for performing D/A and A/D conversion of sound signals, is connected to a sound output device 43 composed, for example, of a speaker. The sound processing part 27 outputs sound signals to the sound output device 43 in accordance with the sound output instructions from the control unit 21 executing processes in accordance with various control programs.

The graphics processing part 29 is connected to the display device 49 has the first image display part 51. The graphics processing part 29 distributes images to the frame memory 35 in accordance with the drawing instructions from the control unit 21 and also outputs video signals for displaying the images on the image display part 51 to the display device 49.

The communication interface 31 is connectable to another system wired or wirelessly, and also is connectable to a communication network such as the Internet. The system 1 can communicate with another game machine using the communication function of the communication interface 31.

The operation input part 39, the memory 37 and the touch panel 45 are connected to the interface part 33. The interface part 33 stores, on the RAM 23, the instruction data from the operation input part 39 based on the user's operation and the instruction data based on the user's operation of the touch panel 45 using a finger or a touch pen 47 etc. Then, the control unit 21 executes an arithmetic processing in accordance with the instruction data stored in the RAM 23.

The touch panel 45 is stacked on the side of the display screen(s) of both or either of the image display part 51. Therefore, the control unit 21 recognizes input information depending on the operation inputs by a player, by managing/controlling the timing of display at the side of both or either of the image display part 51 where the touch panel 45 is stacked, the timing of operation of the touch panel 45 using the touch pen 47 etc. and the position coordinate. The display device 49 may configure the display screen with one image display part instead of having a plurality of image display parts such as the image display part 51.

The interface part 33 executes the processes, in accordance with the instructions from the control unit 21, such as storing the data showing the progress of the game stored in the RAM 23 in the recording medium 70 which is inserted into the card slot 37, or reading out the game data at the time of interruption stored in the recording medium 70 and transferring the data to the RAM 23.

The control unit 21 executes various processes, in accordance with the control program loaded into the RAM 23, such as outputting drawing instructions to the graphics processing part 29, or outputting sound output instructions to the sound processing part 27. While the control unit 21 is executing the processing, the data occurring intermediately depending on the game progress is stored in the RAM 23 used as a working memory.

A Method for Producing Augmented Reality Image

Figure 4:
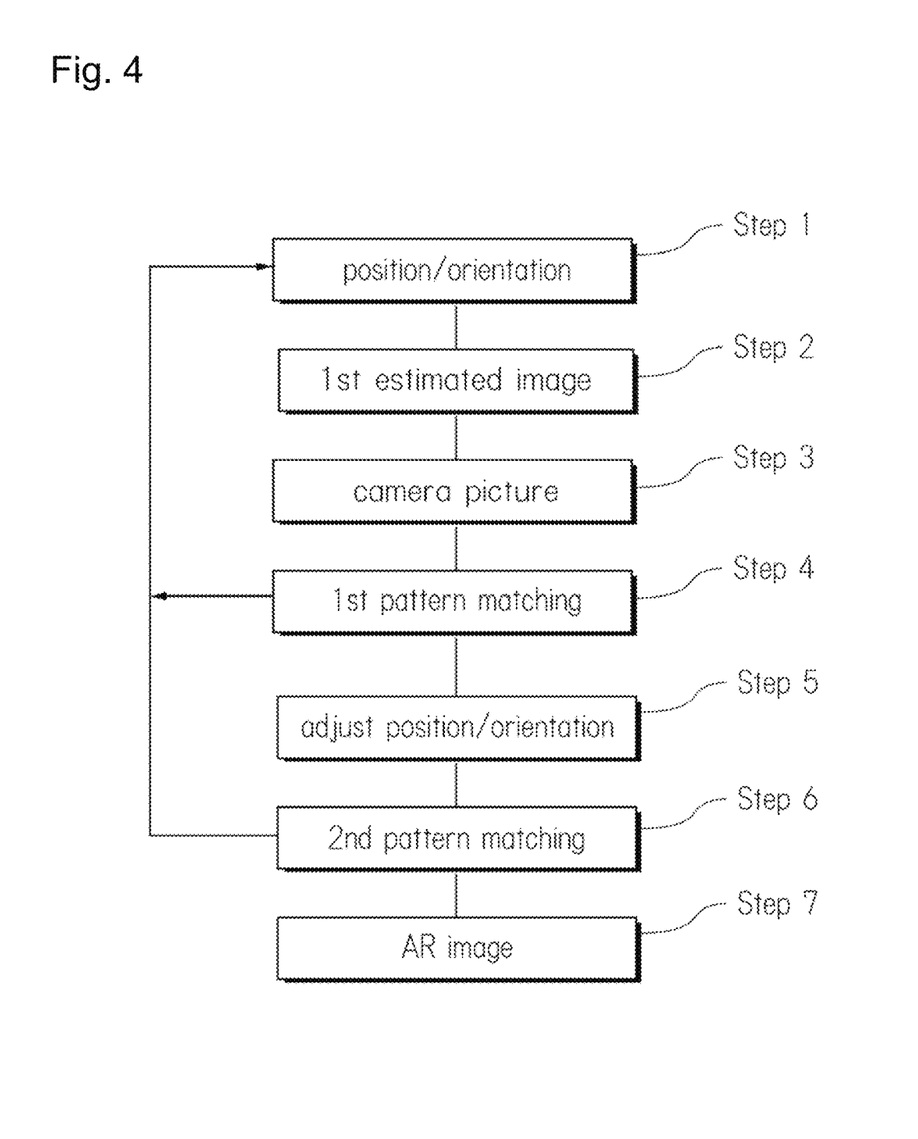
FIG. 4 is a flowchart illustrating a method for producing an augmented reality image.
Figure 5:
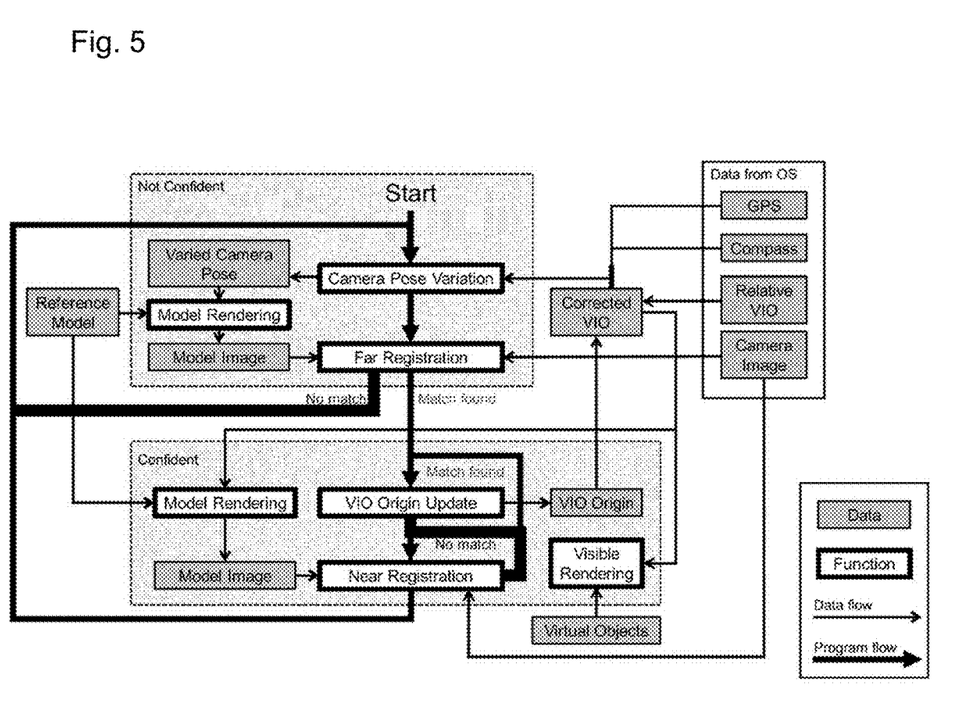
FIG. 5 is an example of data flow to realize AR.

FIG. 4 is a flowchart illustrating a method for producing an augmented reality image. FIG. 5 is an example of data flow to realize AR. The compass in FIG. 5 may contain IMU. As shown in FIG. 5, the system may contain Virtual Input/Output, VIO, system.

Rough Estimation Procedure

This procedure roughly estimates position and orientation of a portable terminal and comprises steps 1 and 2.

Step 1

A portable computer terminal, a terminal, obtains a first estimated position and a first estimated orientation of a first scene by estimating position and three-dimensional orientation of the portable computer terminal by means of a GPS unit, a compass and an inertial measurement unit (IMU) in the portable computer terminal. The GPU unit can obtain a rough position of the terminal. The compass and IMU can obtain three-dimensional orientation. Namely, the position comes from the GPS unit. The pitch and roll orientation come from the accelerometers (in IMU) and the yaw comes from the compass.

Step 2

The portable computer terminal produces a first estimated image of the first scene using the first estimated position and the first estimated orientation. The memory of the terminal store images of various three-dimensional model of the scene from various orientations. The three-dimensional model may be a rendering image which includes one or more buildings. The terminal reads a candidate of the image stored at the memory using the first estimated position and the first estimated orientation. Then the terminal projects a 3D model of the scene to produce an estimated picture of the scene using the first estimated position and orientation. The terminal may read various candidates as the estimated images from the memory that may be used at the following step 4.

Feature/Wide-Baseline Pattern Matching Procedure (Far Registration)

This procedure obtains relatively accurate, approximate, position and orientation of the terminal and comprises steps 3 and 4 (or steps 3 to 5).

Step 3

The portable computer terminal obtains a first camera picture of the first scene by the camera. The first camera picture may be stored at the memory in the terminal. The terminal may continuously take pictures and may store the pictures continuously.

Step 4

The portable computer terminal executes a first pattern matching between the first estimated image and the first camera picture to obtain approximate position and orientation of the portable computer terminal. This step relates to wide-baseline pattern matching. It is preferred that the first pattern matching is executed regarding a building in the first scene. The methods for matching two images are well known. One example for the pattern matching is to convert the image and/or the picture into 3D points and matching is executed using the converted 3D points. In executing matching, size and angle of images, pictures and gathering of 3D points are adjusted using conventional method. If match is not found, it may return to step 1 to obtain approximate position and orientation of the terminal. When prescribed time passes without finding match, the processor may decide that match is not found. Further when matching failed prescribed times continuously, the processor may decide that match is not found.

Figure 6:
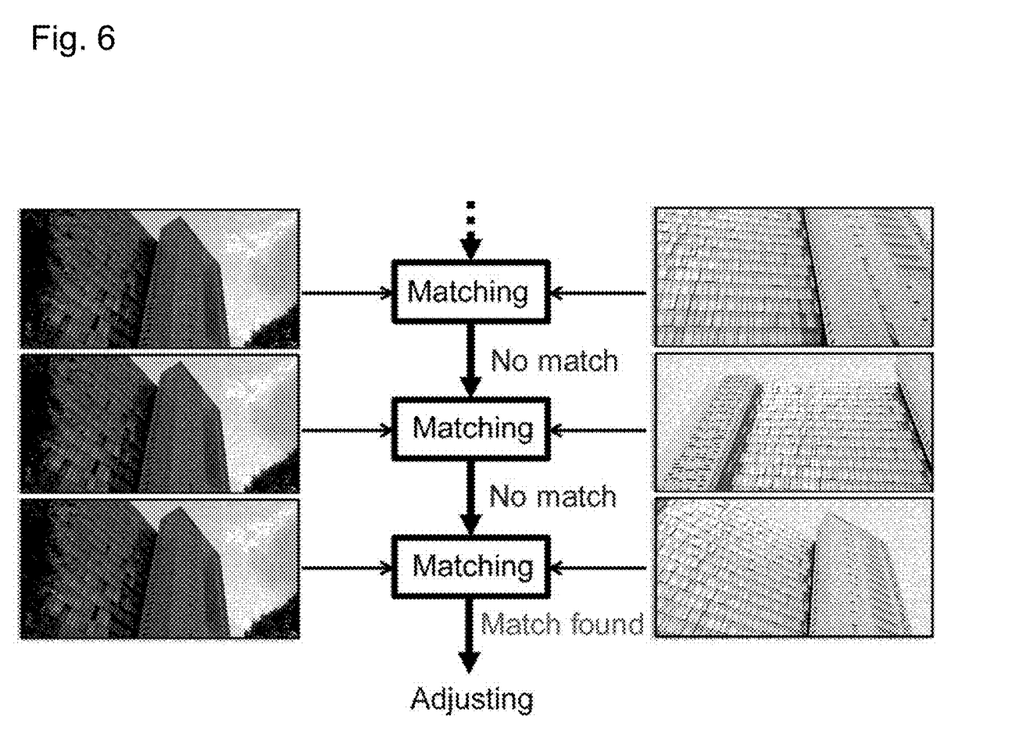
FIG. 6 shows an example of a pattern matching.

FIG. 6 shows an example of a pattern matching. The left side figures are pictures taken by the camera. The right side figures are three dimensional models that are the estimated images and candidates for matching. The upper image, the first estimated image, does not match to the picture. Then the terminal executes pattern matching between the first camera picture and the second estimated image, the middle right image in FIG. 6. The terminal executes pattern matching and realizes that the second estimated image does not match to the picture. Then the terminal executes pattern matching between the first camera picture and the third estimated image, the lowest right image in FIG. 6. In this case match is found.

Step 5

The portable computer terminal adjusts the approximate position (and/or orientation) of the portable computer terminal by an offset to a new possible position and orientation of the portable computer terminal. For example, the position is adjusted considering the three-dimensional model of the scene and the picture taken by the camera.

In case of FIG. 6, the first camera picture and the third estimated image are matched because of 3D points and their relationships match. However, the size of the picture and the image are not the same. Considering the size, the distance form the building, namely the position of the terminal, is adjusted.

If the first estimated image and the first camera picture are assessed to be the same, the position and orientation used at the step 4 is correct. Therefore, it is possible to skip step 5. If initial pattern matching at step 5 is unsuccessful, the terminal may return to step 4.

Flow/Narrow-Baseline Pattern Matching Procedure (Near Registration):

This procedure is to maintain the accuracy of position and orientation estimation over time even when the position and orientation of the terminal change and comprises step 6.

Step 6

Step 6 relates to executing narrow-baseline pattern matching and setting the estimated device position and orientation if step 5 is successful. The portable computer terminal executes a second pattern matching between a second camera picture of the second scene and an image of a second scene to obtain information of a current position and orientation of the portable computer terminal, the second camera picture taken by the camera and the image of the second scene being produced considering the new possible position and orientation of the portable computer terminal. It is preferred that the second pattern matching is executed regarding a building in the second scene. The new possible position and orientation of the portable computer terminal is calculated by means of new pattern matching without using the GPS unit, the compass and the IMU. When prescribed time passes without finding match, the processor may decide that match is not found. Further when matching failed prescribed times continuously, the processor may decide that match is not found.

Augmented Reality Image Procedure:

This procedure creates an AR image, and comprises step 7.

Step 7

Then the portable computer terminal produces an augmented reality image considering the current position and orientation of the portable computer terminal.

The augmented reality image is displayed at the display of the portable computer terminal. Returning to Step 1 if a certain amount of time has passed since the last successful match; otherwise returning to Step 6.

Figure 7:
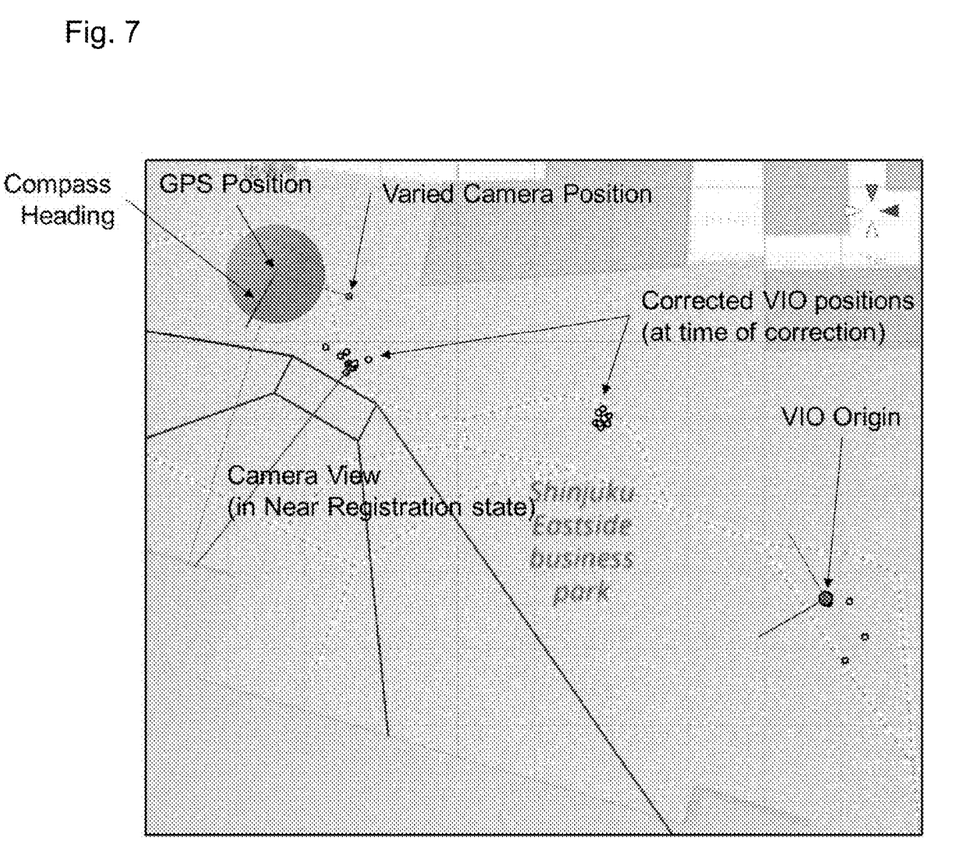
FIG. 7 shows an example of Overhead view.

FIG. 7 shows an example of Overhead view. FIG. 7 shows an example of Compass Heading, GPS Position, Varied Camera Position, Camera View (in Near Registration state), Corrected VIO positions (at time of correction) and VIO Origin.

In the above method, Far Registration is executed when there is relatively large camera pose uncertainty. Virtual objects are not rendered in this state. It is implemented as feature point matching.

Near Registration is executed when it is assumed relatively lower camera pose uncertainty. Virtual objects are rendered in this state. It is suitable for keeping virtual geometry locked to real world image frames. This state may be implemented as optical flow between two edge images.

Other invention disclosed herein relates to a program. The program has instructions for execution by a processor to perform the method disclosed herein. Other invention disclosed herein relates to a non-transitory computer readable storage device. The device has instructions for execution by a processor to perform the method disclosed herein.

Other invention disclosed herein relates to a portable computer terminal for producing an augmented reality image. The terminal comprises a processor, a GPS unit, a compass, an inertial measurement unit, a camera, a display and a memory device having a program stored thereon for execution by the processor to the method disclosed herein. The GPS unit, the compass, the inertial measurement unit, the camera, the display and the memory are coupled to the processor.

The specification further provides a system for producing an augmented reality image comprising:

a means for obtaining a first estimated position and a first estimated orientation of a first scene by estimating position and three-dimensional orientation of a portable computer terminal by means of a GPS unit, a compass and an inertial measurement unit in the portable computer terminal;

a means for producing a first estimated image of the first scene using the first estimated position and the first estimated orientation;

a means for obtaining a first camera picture of the first scene by means of a camera in the portable computer terminal;

a means for executing a first pattern matching between the first estimated image and the first camera picture to obtain approximate position and orientation of the portable computer terminal;

a means for adjusting the approximate position and/or orientation of the portable computer terminal by an offset to a new possible position and orientation of the portable computer terminal;

a means for executing a second pattern matching between a second camera picture and an image of a second scene to obtain information of a current position and orientation of the portable computer terminal, the second camera picture taken by means of the camera and the image of the second scene being produced considering the new possible position and orientation of the portable computer terminal; and a means for producing an augmented reality image considering the current position and orientation of the portable computer terminal. Each means may be replaced with a device or an element. The program may have instructions for making the computer acts as the above system.

Working Example

1 Method

Although the building used for development and testing was chosen for other reasons, it represents a number of challenging attributes that occur in modern urban architecture. Some façade sections are composed of mostly bricks, but the majority of the building's surface area is made of irregular sets of windows jutting out at different horizontal and vertical angles. In the absence of direct sunlight, the edges between brick faces of the building are not distinct and the window faces often have no consistent or strong edge against the sky that they reflect. The building's faces also have a number of components with strong vertically-aligned gradients. Because of this, the method of Arth et al. (2015) was deemed not suitable. More generally, it was considered possible for users to be close enough to the building that it could not be assumed that multiple façade edges would be visible simultaneously.

1.1 Building Model

A 3D model was created of the target building using measurements from satellite imagery and textured using photos taken from ground level. The photos were taken during strongly overcast weather conditions so as to avoid strongly directional lighting effects and simplify the structure of reflections of the sky. The textures were largely free of occluding objects though some small trees close to the building remained. The model geometry was created using a small number of large faces that did not include lower-level differences in relief between individual bricks and orientation between irregular window segments; however, the building's shape and dimensions at a higher level were preserved. In addition to the standard diffuse textures, a binary texture representing the window regions of the model was also created. The purpose of this was to allow simple virtual lighting effects to be rendered accurately onto the building. For example virtual lights should be reflected only on the windows and cast shadows only on the non-window areas. This texture might also be useful as a mask for areas where correspondences are not reliable due to reflection, though this is outside the scope of this work.

1.2 System Design

The core design of the system involves rendering an image (and corresponding depth map) of the building's 3D model from an initial camera pose. The position of this pose comes from the device's GPS data. The pitch and roll orientation come from the device's accelerometers (through ARCore) and the yaw comes from the device's compass. Feature detection and matching is then performed between this rendered image and the current camera frame using BRISK features. Examples of BRISK features may be found in Stefan Leutenegger, Margarita Chli, and Roland Siegwart. 2011. BRISK: Binary Robust Invariant Scalable Keypoints. In 2011 IEEE International Conference on Computer Vision (ICCV). IEEE, (pp. 2548-2555), which publication is hereby incorporated by reference in its entirety for any purpose. The features points on the model are then converted into 3D points in camera space using depths encoded in the depth texture and a RANSAC approach is used to find the translation and rotation between the images. While successful under certain conditions, this technique often fails for a number of reasons. Some of these are related to the characteristics of the building. The features representing brick corners were largely unsuccessful in matching, likely due to the lack of features within the regular repeating pattern. The corners of the gaps in the pattern were much more successful in detection and matching. However, their three-dimensional nature meant that because of the geometric simplicity of the 3D model they were not accurately represented from acute viewpoints.

Lighting in general was another major issue. Since the environment is outdoors, it is dependent on the time of year, time of day and local weather conditions; however, unlike other applications of feature matching, such as visual odometry or stereo depth-sensing, there is no temporal proximity between the two sets of features. Another problem is the affine warping of features due to the difference between the initial pose estimate and the true pose. The warping seriously degrades the probability that the two frames will match. The degree of this problem can be considered proportional to the scale of GPS error and inversely proportional to the distance between the device and the building. Indeed in a number of test situations the former was significantly greater than the latter and the GPS position was reported as inside the building. To mitigate this problem, a heuristic scheme was developed to both constrain the camera to viewpoints further than a certain distance from the building and then vary the camera pose estimate after every failed matching attempt until successful. This variation was achieved by cycling through a set of positional offsets from the initial constrained position. The distance constraint was defined as distance from the building model's convex hull for implementation reasons as well as to avoid certain edge cases around the concave sections of the building's footprint.

In addition to the positional offset, the orientation was also varied to ensure coverage of the true area in cases of severe compass error. While this feature matching was able to detect and match features from the brick facades, it struggled in the windowed facades for a number of reasons. Firstly, the windows reflected other parts of the building as well as parts of nearby buildings. Even the movement of clouds was enough to change the relative intensity of features. Secondly, the jagged arrangement of the windows themselves made these reflections not only more discontinuous and difficult to predict but also made their mapping to a flat texture less accurate. Additionally, the strongest features within the windows were often the arrays of ceiling lights in the offices inside the building. These are not present in the texture images, which were captured outside of regular office hours. While the static, regular and emissive nature of these lights makes them an interesting candidate for further research, especially for lower-light times of day, relying on them would have added further complexity to the modelling process and would not have been possible for all days of the week. To address these problems, other solutions were investigated. A second technique was identified with certain complementary properties. Firstly, the absolute output of a Laplacian filter was obtained for both images. Then the a dense inverse search optical flow algorithm was used to find correspondences between the two images quickly under the assumption that the apparent translation would be very smooth due to the planar nature of the facades. Examples of dense inverse search optical flow algorithms may be found in Kroeger, T., Timofte, R., Dai, D. and Van Gool, L., 2016, October. Fast optical flow using dense inverse search. In European Conference on Computer Vision (pp. 471-488). Springer, Cham., which publication is hereby incorporated by reference in its entirety for any purpose.

A subset of pixels in a grid pattern across the entire camera image were selected along with their corresponding pixel locations in the model image. Those that did not fall on the model were removed from the set. As with the feature-based approach, the remaining model points were unprojected back into 3D and a RANSAC-based algorithm was used to find the 3D transformation between the two images. This optical-flow approach ultimately turned out to be considerably more successful at matching the window regions and faster than feature-matching. However it also required a more accurate initial camera pose estimate and was less robust to large occluding objects.

Bimodal Registration

In order to balance the advantages and disadvantages of these two methods, a hybrid approach was adopted. Initially the system is in a non-confident state where it cannot be sure of the accuracy of the camera pose derived from GPS and compass inputs and thus does not display any virtual content to the user. Since it is more robust to initial positional error, the feature matching routine is used to try to refine the camera pose. Once this is attained, the transformation between the registered camera pose and the VIO pose is calculated and used to place and orient the origin of the VIO system's coordinate space in absolute world coordinates. Once grounded in this manner, the VIO system tracks smoothly and quickly enough to keep virtual geometry locked to the building on a frame-by-frame basis. However it is also possible for the VIO to slowly drift out of alignment, so it is necessary to continue regularly performing registration. However, at this point the system switches to optical flow registration since it has a sufficiently accurate pose estimate and this mode allows corrections to be made more frequently and more reliably when the user pans over the window façades. In this mode, pose variation is not performed. Nonetheless, there are certain situations that will cause the optical flow registration to fail. The most common is that the user simply orients the phone away from the building. If this is only temporary, then the system can resume tracking. However, if the user wanders far enough or the VIO system loses tracking (e.g. when the camera is covered), it is possible for the relative VIO pose's error to be too large for successful registration. To account for this, if the registration has failed for a certain number of consecutive frames or seconds, the system switches back to feature-based matching. In case the VIO pose is still valid, it is retained as an extra pose variation to test. The system also contains a number of other heuristics to improve performance and robustness. One is to simply not attempt any registration when the camera's pitch is below a certain threshold. This is because the building is almost entirely above the horizon from the point of view of the user and visual information from lower angles is less reliable due to occluding objects such as bushes and people. Another is to reject registrations that resolve to poses further than a certain threshold distance from the GPS prediction. This avoids occasional large errors caused by certain degenerate cases.

Figure 8:
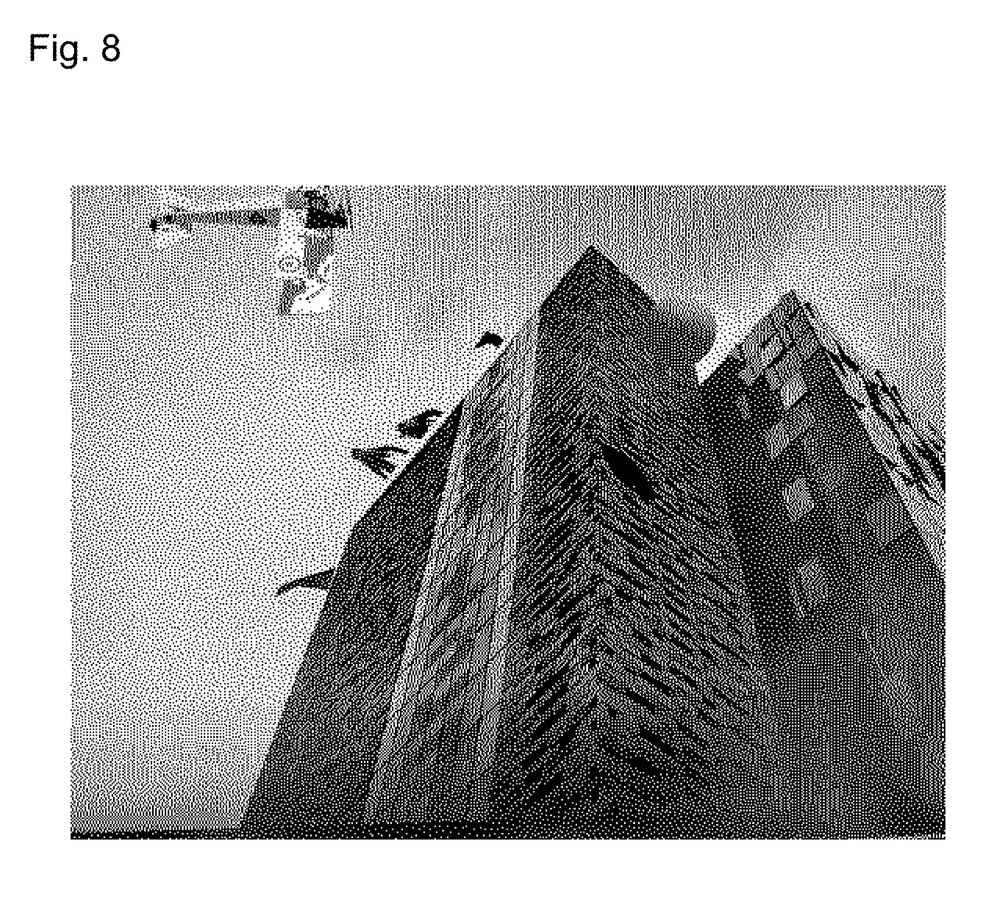
FIG. 8 shows an example of AR image.

FIG. 8 shows an example of AR image. As shown in the figure an airplane flies around buildings, a dragon is at the top of the building, a balloon floats around the buildings and a shade of the balloon is depicted at the side wall of the building.

Implementation

The higher level of the system was implemented with Unity using ARCore for the underlying VIO tracking. The lower-level image processing components were written in C++ using OpenCV.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

INDUSTRIAL APPLICABILITY

An example implementation of the method and system described herein may be useful in the amusement industry.

The invention claimed is:

1. A method for producing an augmented reality image comprising:
    obtaining a first estimated position and a first estimated orientation of a first scene by estimating position and three-dimensional orientation of a portable computer terminal by means of a GPS unit, a compass and an inertial measurement unit in the portable computer terminal;
    producing a first estimated image of the first scene using the first estimated position and the first estimated orientation;
    obtaining a first camera picture of the first scene by means of a camera in the portable computer terminal;
    executing a first pattern matching between the first estimated image and the first camera picture to obtain approximate position and orientation of the portable computer terminal;
    adjusting the approximate position and/or orientation of the portable computer terminal by an offset to a new possible position and orientation of the portable computer terminal;
    executing a second pattern matching between a second camera picture and an image of a second scene to obtain information of a current position and orientation of the portable computer terminal, the second camera picture taken by means of the camera and the image of the second scene being produced considering the new possible position and orientation of the portable computer terminal; and
    producing an augmented reality image considering the current position and orientation of the portable computer terminal,
    wherein executing the first pattern matching comprises terminating the first pattern matching to return to obtaining the first estimated position and the first estimated orientation of the first scene, either when prescribed time passes without finding a match or if the first pattern matching fails prescribed times continuously, and
    wherein executing the second pattern matching comprises terminating the second pattern matching to return to obtaining the first estimated position and the first estimated orientation of the first scene, either when prescribed time passes without finding a match or if the second pattern matching fails prescribed times continuously.

2. The method in accordance with claim 1, wherein the first pattern matching is executed regarding a building in the first scene and the second pattern matching is executed regarding a building in the second scene.

3. A non-transitory computer readable storage device having instructions for execution by a processor to perform the method in accordance with claim 1.

4. A portable computer terminal for producing an augmented reality image comprising:
    a processor, a GPS unit, a compass, an inertial measurement unit, a camera, a display and a memory device having a program stored thereon for execution by the processor to the method in accordance with claim 1.

5. The method of claim 1, wherein the first estimated image is a three dimension image.

6. The method of claim 5, further comprising:
    obtaining the first estimated image from a memory using the first estimated position and the first estimated orientation.

7. The method of claim 6, further comprising:
    storing images of a plurality of three-dimensional models of the first scene from a plurality of orientations in the memory.

8. The method of claim 1, wherein obtaining the first estimated position and the first estimated orientation of the first scene comprises rejecting the first estimated position and the first estimated orientation of the first scene, if a camera's pitch is below a certain threshold.

9. The method of claim 1, wherein producing the first estimated image of the first scene comprises rejecting the first estimated position and the first estimated orientation of the first scene, when the distance between a building in the first estimated image and the first estimated position is longer than a predetermined value.

10. The method of claim 1, wherein producing the augmented reality image comprises:
    reflecting virtual lights are reflected on windows of buildings in the second scene; and
    casting shadows on non-window areas in the second scene.

* * * * *